United States Patent [19]
Baldwin

[11] 3,837,495
[45] Sept. 24, 1974

[54] LIQUID FILTERS
[75] Inventor: Jesse A. Baldwin, Kearney, Nebr.
[73] Assignee: J. A. Baldwin Manufacturing Company, Kearney, Nebr.
[22] Filed: Jan. 27, 1972
[21] Appl. No.: 221,304

[52] U.S. Cl.................. 210/314, 210/440, 210/443, 210/489
[51] Int. Cl......................... B01d 27/04, B01d 27/02
[58] Field of Search.......... 210/314, 440, 443, 457, 210/491, 489

[56] References Cited
UNITED STATES PATENTS

| | | | |
|---|---|---|---|
| 2,288,426 | 6/1942 | Stack | 210/489 |
| 2,328,131 | 8/1943 | Eisler | 210/489 X |
| 2,834,730 | 5/1958 | Painter, Jr. et al. | 210/491 X |
| 3,353,680 | 11/1967 | Niebergall | 210/314 |
| 3,452,877 | 7/1969 | Mesek et al. | 210/491 |

*Primary Examiner*—Frank A. Spear, Jr.
*Attorney, Agent, or Firm*—J. Harold Kilcoyne

[57] ABSTRACT

A liquid (engine-lubricating oil) filter comprising a closed-ended can-type housing, one end closure having oil inlet openings and a centrally disposed oil outlet opening; and a filter element or cartridge mounted in coaxial relation within the housing and including an outer cylindrical screen closed top-and-bottom by end caps, an inner, smaller-diameter cylindrical screen (center tube) disposed coaxially within the outer cylindrical screen and disposed therewithin so that it terminates well short of the upper end cap of said outer cylindrical screen, a part-flow section filling the annular space between said center tube and said outer cylindrical screen for the full axial length of said center tube, said part-flow section comprising a form-sustaining winding of cotton filtering material, and a full-flow section substantially completely filling the cylindrical space within said outer cylinderical screen above said part-flow section, said full-flow section comprising a self-contained, form-sustaining disc provided by superimposed layers of non-absorbent rayon viscose filaments which been subjected to a crimping treatment and thereupon texturized and said layers being secured together in face engagement by means, such as needling, which does not substantially impede oil flowing axially through the layer interface, said full-flow section resting directly on and being supported substantially completely by said part-flow section.

4 Claims, 3 Drawing Figures

PATENTED SEP 24 1974          3,837,495

LIQUID FILTERS

INTRODUCTION

This invention relates to improvements in liquid filters, and more particularly, although not exclusively, in engine-mounted filters for use in filtering out contaminants usually present therein from the lubricating oil being supplied to the bearings and/or other parts of an automotive engine requiring lubrication, under the pressure developed by the engine-driven oil pump.

More specifically, the invention relates to an improved dual media-, parallel flow path-, dual flow rate-type filter cartridge characterized by a novel form and composition of a full-flow section, and further by a novel relation and disposition of said full-flow section with respect to an associated part-flow section.

OBJECTS OF THE INVENTION

Among the objects of the present invention may be noted the provision of a highly efficient, practical, relatively inexpensive, and readily put together dual media-, parallel flow path-, dual flow rate-type filter cartridge for removing therefrom by a filtering procedure the contaminants usually present in the lubricating oil being supplied to the bearings and/or other parts of an automotive engine requiring lubrication, under the pressure developed by the conventionally provided engine-driven oil pump; the provision of a dual media-, parallal flow path-, dual flow rate-type oil filter cartridge as aforesaid characterized by a novel full-flow section provided by a preformed and form-sustaining disc consisting of superimposed layers of non-absorbent rayon viscose filaments, which have been subjected to a crimping treatment and thereupon texturized to the form of said discrete layers and which are secured together in face engagement by means which does not substantially impede oil flow axially through their interface, and by a part-flow, lower flow-rate, "wound" cotton section comprising a "rope" of assorted cotton threads annularly wound on a perforated core, preferably the center tube of the filter element; and wherein the full-flow disc-form section and the wound part-flow section are assembled in coaxial relation, with the full-flow section supported on the wound section and in substantially full-open communication therewith.

DETAILED DESCRIPTION

Figure 1:
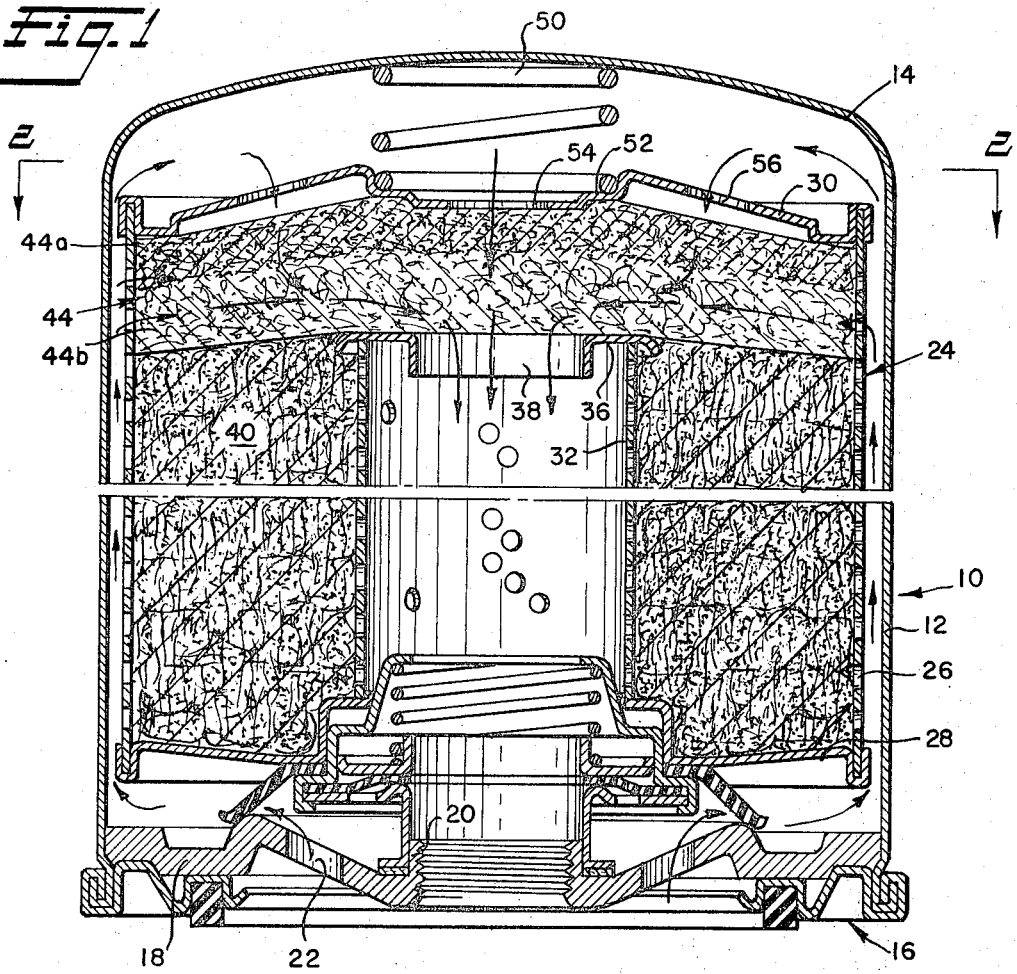
Figure 2:
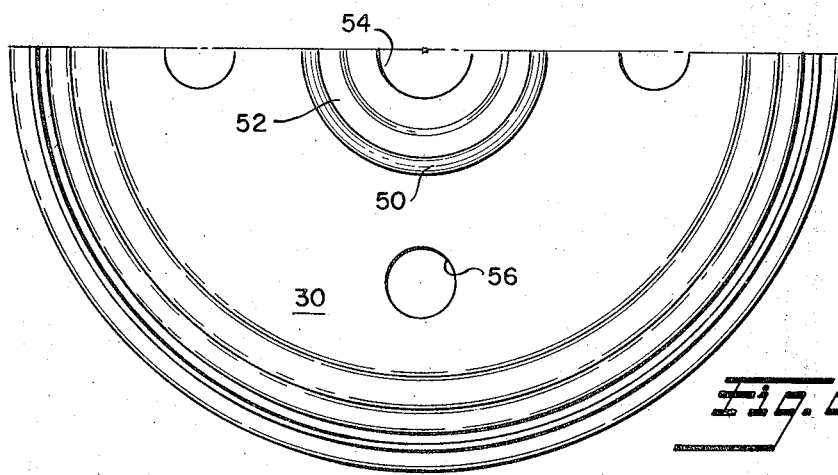
Figure 3:
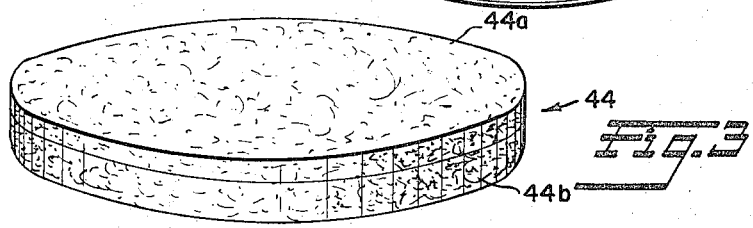

The above and other objects and features of advantage of the improved dual media-, parallel flow path and dual flow rate-type oil filter cartridge according to the invention will be in part obvious and in part hereinafter pointed out in the following description of the invention, in which reference is had to the accompanying drawing, wherein FIG. 1 is a broken-away vertical section of a liquid (automotive engine lubrication oil) filter according to the invention, the view exaggerating for disclosure purposes the rope formation of the assorted cotton threads which, when wound to the form of an annular body on the center tube, provide the part-flow section on which the full-flow section rests;

FIG. 2 is a half section of the filter taken on a horizontal plane 2—2, FIG. 1; and FIG. 3 is a perspective view illustraging the preformed and form-sustaining disc comprising the full-flow section of the invention, prior to its being rested on the wound part-flow section.

Referring to the aforesaid drawing figures in greater detail, the improved filter of the invention illustratively comprises a conventional can-type housing 10 provided by a cylindrical thin-wall can body 12 which is closed at its upper (distal from its mounting) end by an integral, usually dome-shaped end wall 14 and at its bottom end by a closure-plate assembly 16 including a heavy-guage base plate 18 having a central opening defined by an axially-inwardly directed neck 20, and being further provided with a plurality of smaller-size, circumferentially-spaced through openings 22 disposed on a circle of radius substantially greater than that of said neck opening. It will be understood that said circumferentially-spaced series of openings 22 function as oil-inlet openings to the can interior and that the bore through the neck 20 functions as the oil outlet passage from the can interior through which filtered oil is returned to the engine oil line.

Mounted within and coaxially with respect to the closed-ended can 10 is a so-called filter element or cartridge designated 24, which illustratively comprises an outer cylindrical screen 26 closed at its bottom end by an end cap 28 and at its upper end by an upper end cap 30, and an inner smaller-diameter tubular screen 32, hereinafter to be referred to as the center tube, whose bore opens into that of the aforesaid base plate neck 20.

By reference to FIG. 1 in particular, it will be seen that the axial length of the center tube 32 is substantially less than that of the outer cylindrical screen 26, and thus that the center tube terminates well short of both the upper edge of the outer cylindrical screen 26 and the under face of the upper end cap 30 which is affixed as by clinching to said latter edge.

Preferably, the upper-end edge of the center tube 32, rather than being left as a raw or relatively sharp edge, is sheathed by an annular ring 36 whose central opening 38 provides an oil flow opening to the bore of said center tube 32. Illustratively, the annular ring 36 has appreciable radial width whereby it is capable of functioning as a small-width supporting shelf for any more or less form-sustaining body laid thereon.

According to the invention, the annular space between the center tube 32 and the inner wall surface of the outer cylindrical screen 26 is completely filled by a part-flow section designated 40, which preferably consists of assorted cotton threads loosely associated into rope form and wound on a core, which latter may be and preferably is said center tube itself. Such a wound part-flow section may be fabricated in a winding machine of the type disclosed and claimed in my U.S. Pat. No. 2,665,078, dated Jan. 4, 1954, with the wound section having generally annular configuration and being characterized by a substantially homogeneous structure throughout both its radial and axial extent and being further sufficiently resistant to deformation in both axial and radial directions as to be fully capable of supporting a coaxially related flow section assembly directly thereon.

The invention also contemplates and provides a so-called full-flow section consisting of a preform, i.e. a self-contained full circular disc 44, of an oil filtering material (whose composition will be shortly described) which is assembled and operatively related on and to the wound part-flow section 40 by simply placing the same in related position partly on said wound part-flow section and partly on the annular ring 36 affixed to the upper-end edge of the center tube 32. By providing said disc 44 in its fabrication with diameter substantially equal to the full internal diameter of the outer cylindrical screen 26 and with axial thickness slightly greater than that of the axial depth of the unfilled space within the outer cylindrical screen, i.e., the space above that taken up by the part-flow section 40, said full-flow section will, simply as an incident to its being inserted through the open upper end of said outer screen (such assuming that the upper-end cap 30 has not yet been applied) to a depth such that it rests on the part-flow section 40, completely fill said unfilled space. It will be understood that following such insertion the upper-end cap 30 is applied (clinched) to the upper edge of the outer screen, such resulting in said full-flow section being pressed tight against the upper-end face of said part-flow wound section and in full open communication therewith.

Discussing now the make-up and composition of the disc-form full-flow filter section 44, such by reference to FIG. 3 is of multi-layer construction (two layers designated 44a, 44b being illustrated), and said layers are secured one to the other in face engagement preferably by needling, a form of layer-to-layer securement which has been found to be highly effective for the reason that it does not impede oil flow in axial direction through the interface.

Illustratively, said layers are each composed of non-absorbent rayon viscose filaments or yarns which have been crimped and subsequently texturized, i.e., brought together into rough sheet form, as by passing the filaments or yarn bundles thereon through apparatus such as that disclosed in U.S. Pat. No. 3,431,609 dated Mar. 11, 1969.

It is also desirable that the layers making up the full-flow section 44 have different density and that, for a reason to be given hereinafter, the relatively upper layer 44a have the greater density and, correspondingly, that the relatively lower layer have a substantially lesser density. The aforesaid difference in densities can be readily provided as by using 15 denier filament or yarn in fabricating the upper layer 44, and 40 denier filament or yarn in the fabrication of the lower layer 44b.

As is conventional, a filter cartridge generally designated 24 constituted as in the foregoing has lesser overall diameter and axial length than the closed-ended filter housing 10 and it is adapted to be mounted coaxially within said filter housing 10 and in the normal path of oil flow between said series of inlet openings 22 in the base plate and the bore of the base plate neck 20. The filter cartridge 24 is as usual also spring-biased relatively downwardly, i.e., towards the bottom closure plate assembly 16, by a coil spring 50 under axial compression interposed between the closed end 14 of the filter housing and the upper cap 30 of said filter cartridge, it being observed that the lower end of said coil spring engages in a depressed spring seat 52 formed in said upper cap which is provided with a relatively large-diameter central opening 54. Said upper end cap is also provided with a series of circumferentially-spaced smaller openings 56, and it will be seen that oil entering the filter housing 10 through the bottom closure-plate openings 22 under pressure developed by the engine oil pump will, after flowing to the upper-end portion of the housing, tends to flow axially downwardly through the full-flow section 44, as indicated by the direction-of-flow arrows, to the bore of the center tube 32 and hence downwardly through said bore.

However, it is to be understood that, rather than the path of flow of that portion of the oil entering the filter cartridge through the upper-cap openings 56 (and also through the upper-end perforations of the cylindrical screen 26) continuing straightway to (and/or turning downwardly in the direction of) the upper-end face of the part-flow wound section 40 on which said full-flow section 44 rests, the oil flow path, because of the relatively lesser density of the lower layer 44b of the full-flow section, is instead in radial-inward direction until, ultimately, it combines with that portion of the oil which has flowed into the filter cartridge through the center opening 54 in said upper-end cap, with the combined flow thereafter being straight downward through the bore of the center tube and outwardly from the filter housing through the outlet passage in the base-plate neck 20.

A portion of the oil entering the interior space within the filter housing 10 through the inlet opening(s) 22 provided in the base plate 18, if not already so, will eventually become viscous or flowable to the degree that it can be forced under the pressure developed by the engine-driven oil pump radially-inwardly through the wound cotton section 40 to the bore of the center tube 32, where it combines with the oil flowing axially through the center tube bore from the full-flow section 44.

From the foregoing, it will be appreciated that the invention provides an effective, inexpensive, readily-put-together dual media-, parallel flow path-, dual flow rate-type filter cartridge for cleaning automotive engine lubricating oil upon the latter being forced under pressure of the engine-driven oil pump into and through the filter 10.

Although not described in detail, it is also contemplated that said filter 10 will be provided with anti-drainback valve means and with front- or bottom-end bypass valve means, which are preferably of the structural form, type and mode of operation of the anti-drainback valve means and front- or bottom-end bypass means as disclosed and claimed in my application for Letters Patent Ser. No. 121,367, filed Mar. 5, 1971 now U.S. Pat. No. 3,774,764. However, since said anti-drainback valve means and similarly the front- or bottom-end bypass means represent different inventive concepts which may be used in or with liquid filters other than that herein disclosed and claimed, no detailed description thereof is considered to be here necessary.

It is to be further understood that modifications and structural changes encompassed within the scope of the novel concepts and claimed subject-matter of the present invention are possible, without departing from the scope of the invention.

I claim:

1. A liquid filter comprising: a closed-ended, generally cylindrical housing, the relatively lower end closure thereof having at least one inlet opening to and a central outlet passage from the interior space of said housing; and a generally cylindrical filter cartridge mounted coaxially within said housing and in the path of oil flow between said inlet opening and said outlet passage, said filter cartridge including an outer cylindrical screen extending the full axial length of the cartridge, end caps affixed to the ends of said screen and a perforated wall center tube having substantially lesser axial length than said outer cylindrical screen and being assembled therein with its relatively lower end in communication with said outlet passage and with its upper end terminating well short of the upper end cap and in substantially full open communication with the cylindrical space within said outer cylindrical screen extending above said center tube, a part-flow form-sustaining section completely filling the annular space between said outer cylindrical screen and said center tube, said section consisting of a "rope" of assorted cotton threads wound to annular configuration, and a full-flow section comprising a full-circular preform substantially completely filling said cylindrical space within said outer screen extending above said center tube and providing radial inward and axial paths of flow to the center tube, said full-flow section resting directly on and being supported substantially completely by said part-flow section.

2. A filter according to claim 1, wherein said full-flow section consists of a preformed body of crimped and texturized non-absorbent rayon viscose filaments.

3. A filter according to claim 1, wherein said full-flow section comprises relatively upper and lower layers of crimped and texturized non-absorbent rayon viscose filaments secured in face engagement by means permitting relatively free and unimpeded flow of liquid through the interface.

4. A filter according to claim 3, wherein the filaments making up said relatively upper and lower layers are of the order of 15 and 40 denier, respectively.

* * * * *